US011526951B2

(12) United States Patent
Cupid et al.

(10) Patent No.: US 11,526,951 B2
(45) Date of Patent: Dec. 13, 2022

(54) REAL MEAL WITH VIRTUAL NETWORKING

(71) Applicants: Craig L. Cupid, Mableton, GA (US); Lisa N. Cupid, Mableton, GA (US)

(72) Inventors: Craig L. Cupid, Mableton, GA (US); Lisa N. Cupid, Mableton, GA (US)

( * ) Notice: Subject to any disclaimer, the term of this patent is extended or adjusted under 35 U.S.C. 154(b) by 0 days.

(21) Appl. No.: 16/883,688

(22) Filed: May 26, 2020

(65) Prior Publication Data

US 2021/0374884 A1 Dec. 2, 2021

(51) Int. Cl.
| | | |
|---|---|---|
| *G06Q 30/06* | (2012.01) | |
| *G06Q 50/12* | (2012.01) | |
| *G06Q 10/10* | (2012.01) | |
| *G06F 16/9535* | (2019.01) | |

(52) U.S. Cl.
CPC ......... *G06Q 50/12* (2013.01); *G06F 16/9535* (2019.01); *G06Q 10/1095* (2013.01); *G06Q 30/0635* (2013.01)

(58) Field of Classification Search
CPC .............. G06Q 50/12; G06Q 10/1095; G06Q 30/0635; G06F 16/9535
USPC ...................................................... 705/7.019
See application file for complete search history.

(56) References Cited

U.S. PATENT DOCUMENTS

| | | | | |
|---|---|---|---|---|
| 8,838,501 B1* | 9/2014 | Priebatsch | ......... | G06Q 20/3821 705/64 |
| 10,685,333 B2* | 6/2020 | Poole | ................... | G06F 21/6209 |
| 2004/0044578 A1* | 3/2004 | Kim | ........................ | G06Q 30/06 705/15 |
| 2009/0204492 A1* | 8/2009 | Scifo | ................... | G06Q 30/0601 705/26.1 |
| 2013/0138529 A1* | 5/2013 | Hou | ........................ | G06Q 10/08 705/26.5 |
| 2013/0151357 A1* | 6/2013 | Havas | ..................... | G06Q 50/12 705/15 |
| 2015/0142611 A1* | 5/2015 | Kaplan | ............... | G06Q 30/0635 705/26.81 |
| 2018/0165656 A1* | 6/2018 | Tessler | ............... | G06Q 10/1095 |
| 2019/0026684 A1* | 1/2019 | Martinez | .............. | G06Q 10/083 |
| 2019/0050919 A1* | 2/2019 | Shadrokh | ............... | G06Q 50/12 |

(Continued)

OTHER PUBLICATIONS

Mauricio "30 best food ordering websites ideas", Aug. 2018, Ordering Online Service, pp. 1-29 (Year: 2018).*

*Primary Examiner* — Romain Jeanty
(74) *Attorney, Agent, or Firm* — BakerHostetler

(57) ABSTRACT

A system may include one or more processor and memory coupled with the one or more processors that effectuates operations. The operations may include generating an interface (e.g., graphical) for a second user for a second profile to order food associated with a first profile of a first user during a period, wherein the period is designated by the first user; receiving an indication of a first order of food associated the first profile during the period; sending instructions to prepare the first order of food; receiving an indication that the first order is paid by an account associated with the first profile; receiving an indication of an address to deliver the food and an indication not to expose the address to the first profile (e.g., keep private, such as do NOT display or send the address); and sending instructions to display the progress in delivering the food to the address.

20 Claims, 8 Drawing Sheets

(56) References Cited

U.S. PATENT DOCUMENTS

2020/0293955 A1* 9/2020 Mohammed ........... G06Q 50/12
2020/0387952 A1* 12/2020 Khorakiwala ..... G06Q 30/0603

* cited by examiner

REAL MEAL WITH VIRTUAL NETWORKING

SUMMARY

Nowadays more and more people are interacting remotely using the Internet. People interact via video calls, instant messaging, or voice call, among other things. Further, wherein there is an epidemic or pandemic, there may be an increased need to be physically distant from others. Although there may be a need to be physically distant from others, people may still desire to engage in activities that conventionally are thought to require being in close proximity, such as lunch meetings in which a sales person would like to invite a client or a prospective client to lunch and discuss business or nonbusiness topics, while the sales person pays for the meal. The disclosed subject matter may enable real meals in a virtual social environment.

In an example, a system may include one or more processor and memory coupled with the one or more processors that effectuates operations. The operations may include generating an interface (e.g., graphical) for a second user for a second profile to order food associated with a first profile of a first user during a period, wherein the period is designated by the first user; receiving an indication of a first order of food associated the first profile during the period; sending instructions to prepare the first order of food; receiving an indication that the first order is paid by an account associated with the first profile; receiving an indication of an address to deliver the food and an indication not to expose the address to the first profile (e.g., keep private, such as do NOT display or send the address); and sending instructions to display the progress in delivering the food to the address.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Nowadays more and more people are interacting remotely using the Internet. People interact via video calls, instant messaging, or voice call, among other things. Further, wherein there is an epidemic or pandemic, there may be an increased need to be physically distant from others. Although there may be a need to be physically distant from others, people may still desire to engage in activities that conventionally are thought to require being close proximity, such as lunch meetings in which a sales person would like to invite a client or a prospective client to lunch and converse about business or nonbusiness topics, while the sales person pays for the meal. Another example of a conventional close proximity activity may be a of a romantic nature, in which one of the individuals on the date pays for the meal for both individuals. The disclosed subject matter may enable real meals in a virtual social environment.

Figure 1:
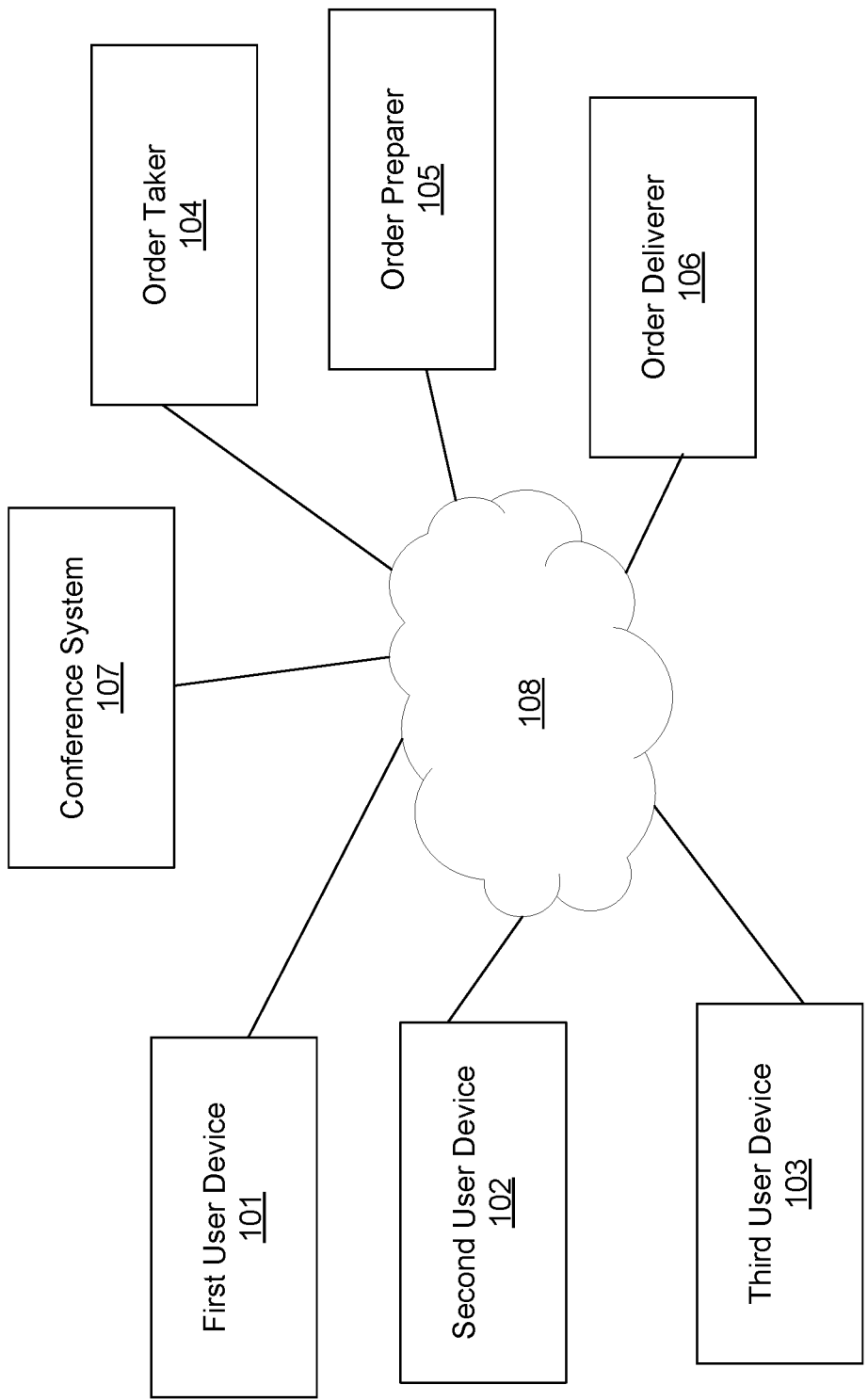
FIG. 1 illustrates an exemplary system for a real meal with virtual networking.

FIG. 1 illustrates an exemplary system for a real meal with virtual networking, as disclosed herein. System 100 may include multiple devices, such as device 101-device 107, which may be communicatively connected to each other, such as via network 108. Device 101 may be at location 111, device 102 may be at location 112, device 103 may be at location 113. In an example, device 101 and device 102 may be a mobile device.

With continued reference to FIG. 1, a mobile device may include a laptop, tablet, autonomous vehicle (e.g., SAE Intl level 3 to level 5 automation), or mobile phone, among other things. Device 101-device 106 may include wireless or wired devices, such as servers, routers, switches, desktop computers, or the like. Device 101 may be referred to as first user device 101, device 102 may be referred to second user device 102, or device 103 may be referred to as a third user device 103. Device 104 may be referred to as order taker device 104, device 105 may be referred to as order preparer device 105, or device 106 may be referred to as order deliverer device 106. Device 108 may be referred to as conferencing system 108. Conferencing system 108 may be similar to Zoom, GoTo Meeting, or Web Ex, and may be integrated into the online service for ordering food associated with device 104-device 106.

First user device 101 may be associated with a first profile of a first user. First user device 101 may a mobile phone. Second user device 102 and third user device 103 may be associated with respective different profiles for respective different users. First user device 101 may connect with order taker device 104 via browser interface, phone application, or the like. First user device 101 may connect with order taker device 104 in order to order food, schedule electronic appointments (e.g., physically distant appointments), or other appointments. Order preparer device 105 may accept orders that have been scheduled electronically and send instructions for the accepted orders to be prepared. Order deliverer device 106 may receive an indication (e.g., an alert) that an order is ready to be picked up and delivered to a destination. It is contemplated herein that the functions of device 101-device 106 may be distributed over multiple devices which may be physical or virtual.

Figure 2:
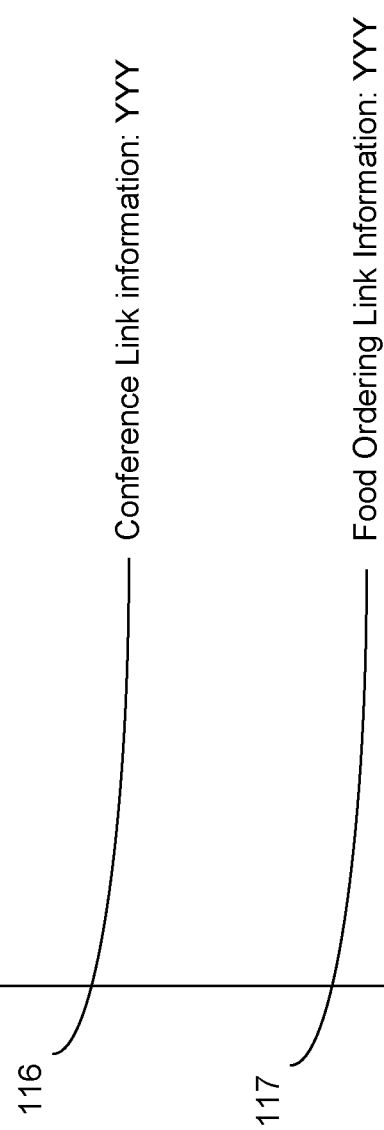
FIG. 2 illustrates an exemplary message for a real meal with virtual networking.

FIG. 2 illustrates an exemplary message for a real meal with virtual networking as disclosed herein. Block 115 may be an electronic message that may be for an appointment at a date and time. The electronic message may include information for an electronic appointment (e.g., video conference link, teleconference link, or other conference identifier) and ordering information for ordering food or other products associated with the electronic appointment. Example ordering information may include budgets for food purchase, selection of types of foods or restaurants, links to a food ordering system, or the like.

Figure 3:
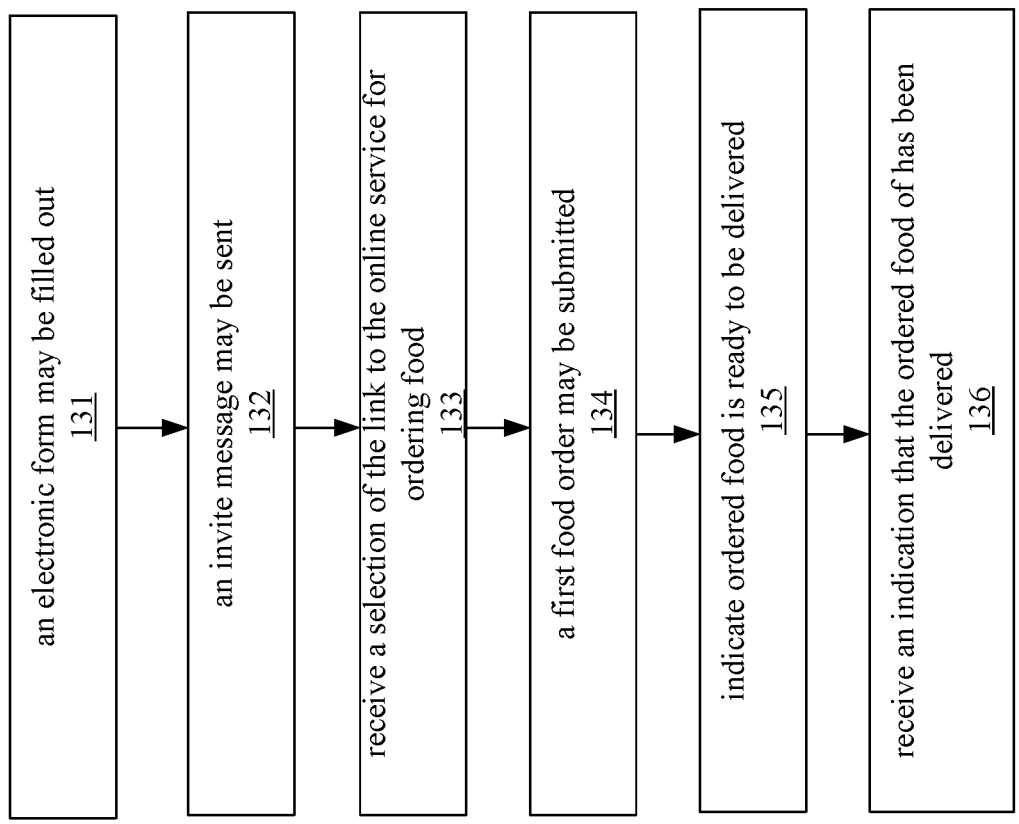
FIG. 3 illustrates an exemplary method for a real meal with virtual networking.

FIG. 3 illustrates an exemplary method for a real meal with virtual networking as disclosed herein. At step 131, an electronic form may be filled out. The filled electronic form may be identified with a first profile of a first user. The electronic form may have fields that include an electronic address identifier for one or more users (e.g., second user with second user device 102 or third user with third user device 103). An electronic address identifier may include an e-mail address, phone number, name, social media account identifier, application account identifier, or the like.

With continue reference to FIG. 3, in an example scenario, via first user device 101, the first user may access order taker device 104 in order to schedule a meal delivery or virtual meeting with the second user of second user device 102. There may be a default setting or a setting set by any authorized user (e.g., second user) that the physical address for delivering meal be marked as private. Being marked as private or the like indicates that no one else (such as the first user) should have access the physical delivery address unless needed for delivery (e.g., delivery person or autonomous vehicle delivering the meal) or otherwise authorized by the second user. In this scenario, the first user, is not made aware via the website (e.g., or app) for online ordering (e.g., website connected with order taker device 104) of the particular location of the second user or the location in which the order will be sent. Order taker device 104, order prepare device 105, or order deliverer device 106 may be aware of the particular location of the second user. The particular location of the second user may be based on a physical address or GPS of second user device 102. It is contemplated that a message or other indication may be sent to first user device 101 of the general location of the second user in which the order will be sent. The generic location label may include terms such as "home," "work," "remote," a city, a state, or other label that may be created by second user that is not the particular location. The general location may be based on the particular location, but not shown via the website and just shown as the generic (or less specific) location label. Again, it is contemplated that the order taker device 104, order preparer device 105, or order deliverer device 106 should receive permission to release the address to others before a user, such as the first user, can be presented with the particular location of the second user.

At step 132 of FIG. 3, an invite message may be sent to second user device 104, such as the invite message of FIG. 2. The invite message may include a link (e.g., URL) to an online service for ordering food (e.g., a website or other interface). As disclosed in more detail herein, the invite message may include appointment information for an online meeting (e.g., using conferencing system 107). A threshold amount of time to purchase the food or use the link before expiration may be based on the meeting appointment associated with an electronic calendar. The time threshold that is set may be based on the amount of time to prepare (e.g., restaurant or end user) the food, deliver the food, or unpack the food for eating, or the like. The meeting appointment may be for a video conference, a teleconference, virtual reality conference (e.g., virtual or augmented reality of one or more persons).

Figure 4:
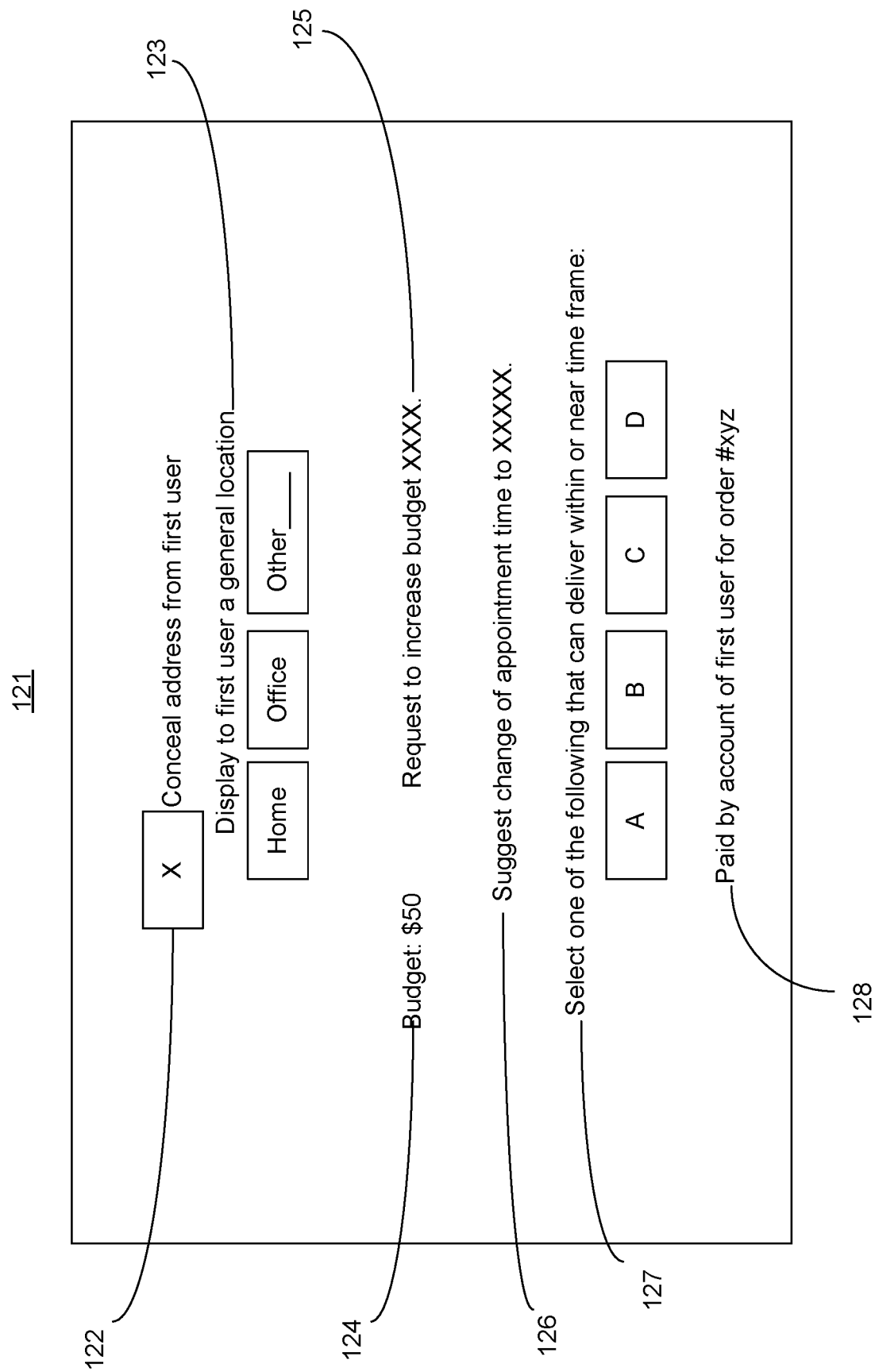
FIG. 4 illustrates an exemplary electronic form or display for a real meal with virtual networking.

At step 133, second user device 102 may receive a selection of the link to the online service for ordering food and information for the online service for ordering food may be displayed. The online service for ordering food may be one type (e.g., genre) or multiple types. For example, the food types may be Italian or Chinese food. The online service for ordering food may for a particular restaurant (e.g., Chicken Restaurant X franchise) or multiple restaurants (e.g., Chicken Restaurant X franchise, Chicken Restaurant Y franchise, and Seafood Restaurant Z franchise). As shown in FIG. 4, the online service for ordering food may include an indication that the food may be paid by someone else (e.g., first user or conference organizer). There may be an option for the second user to reject the first user's offer to pay for food, therefore the second user may pay for any food ordered. The online service for ordering food may include an indication of a budget for purchase of the food. There may be an option to go over the budgeted amount and pay in which the account of the second user pays for the overage. The budget may be considered a threshold monetary amount for the purchase or a threshold number of food items. In addition, there may be other limits incorporated into the online service for ordering food, such as a threshold amount of time to purchase the food, or a threshold amount of time to use the link of step 132. The threshold amount of time to purchase the food or use the link may be based on the meeting appointment associated with an electronic calendar; wherein the time budget is based amount of time to prepare (restaurant or end user), deliver the food, or unpack for eating, or the like. The graphical interface of the online service for ordering food may be displayed as a generic interface that has the same formatting for most users or the graphical interface may be designed to have an indication of a corporation in which the first user is employed by or owns. The available options (e.g., restaurants or food) may be based on ability to deliver within or near the appointment meeting time.

At step 134, a first food order may be submitted to the online service for ordering food via the order taker device 104. At step 135, instructions may be sent to order deliverer device 106 to that the the ordered food of step 134 is ready to be delivered. Order deliverer device 106 may deliver the food. Order deliverer device 106 may be an unmanned vehicle or autonomous vehicle. At step 136, first user device 101, second user device 102, order taker device 104, order preparer device 105, or order deliverer device 106 may receive an indication that the ordered food of step 134 has been delivered. There may a graphic that displays which user received or did not receive food that was ordered. First user device 101 may have ability to view status (e.g., progress) of food preparation or delivery for second user and multiple other users designated for that meeting appointment time.

FIG. 4 illustrates an exemplary electronic form or display 121 for a real meal with virtual networking as disclosed herein. Fields such as field 122-field 128 may be displayed. The fields may be alerts or need interaction to fill in the blanks, toggle boxes (e.g., turn off or turn on), or the like to set different options or send requests. Field 122 may for concealing (e.g., marking private) the address from the first user that is paying for the meal. Field 123 may be for indicating a generic location label. Field 124 may be for indicating the budget and field 125 may be fore requesting an increased budget. Field 126 may be for suggesting a change for a meeting appointment time. Field 127 may be based on only a select few restaurants or food orders that can meet the meeting appointment time. Field 128 may indicate that another user is paying for a particular order.

Figure 5:
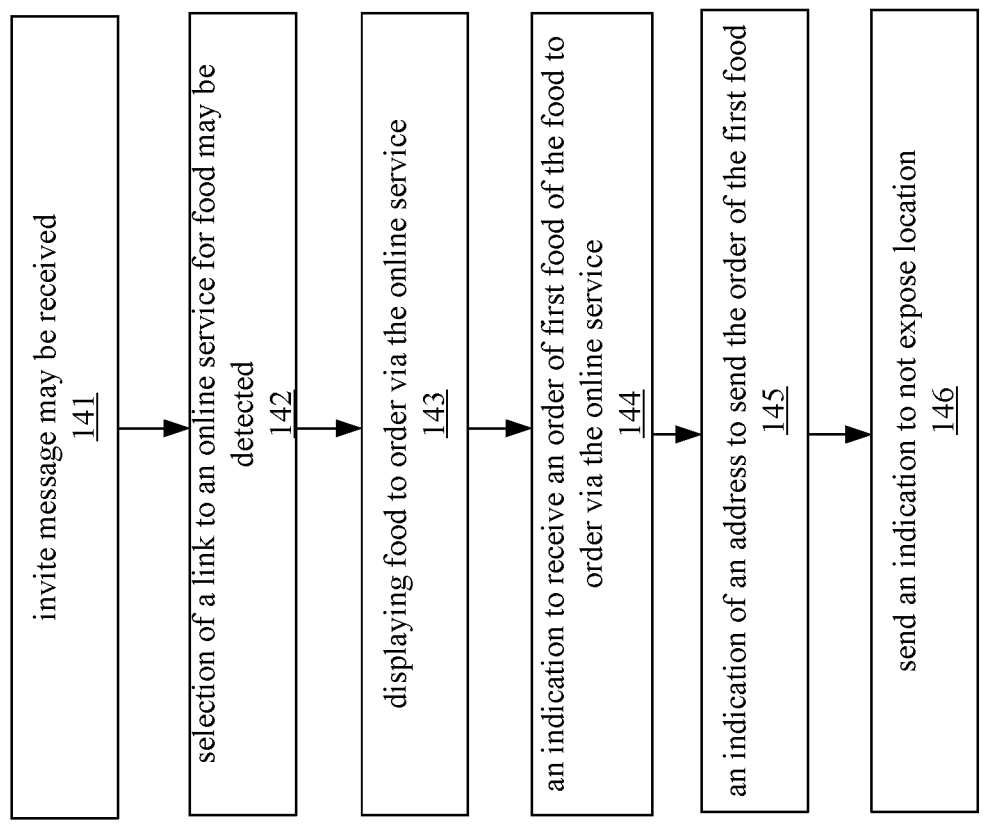
FIG. 5 illustrates an exemplary method for a real meal with virtual networking.

FIG. 5 illustrates an exemplary method for a real meal with virtual networking as disclosed herein. At step 141, an invite message may be received. The invite message may be from a first profile of a first user. At step 142, a selection of a link to an online service for food may be detected. The link may be included in the invite message. The selection may for a second profile of a second user. At step 143, based on the selection, subsequently displaying food to order via the online service. In addition, there may be a display of an indication that the food to order via the online service is paid by an account associated with the first profile. At step 144, there may be an indication to receive an order of first food of the food to order via the online service. At step 145, send, e.g., by second user device 104, an indication of an address to send the order of the first food. At step 146, send an indication to not expose (e.g., mark as private) the address to the first user.

Figure 6:
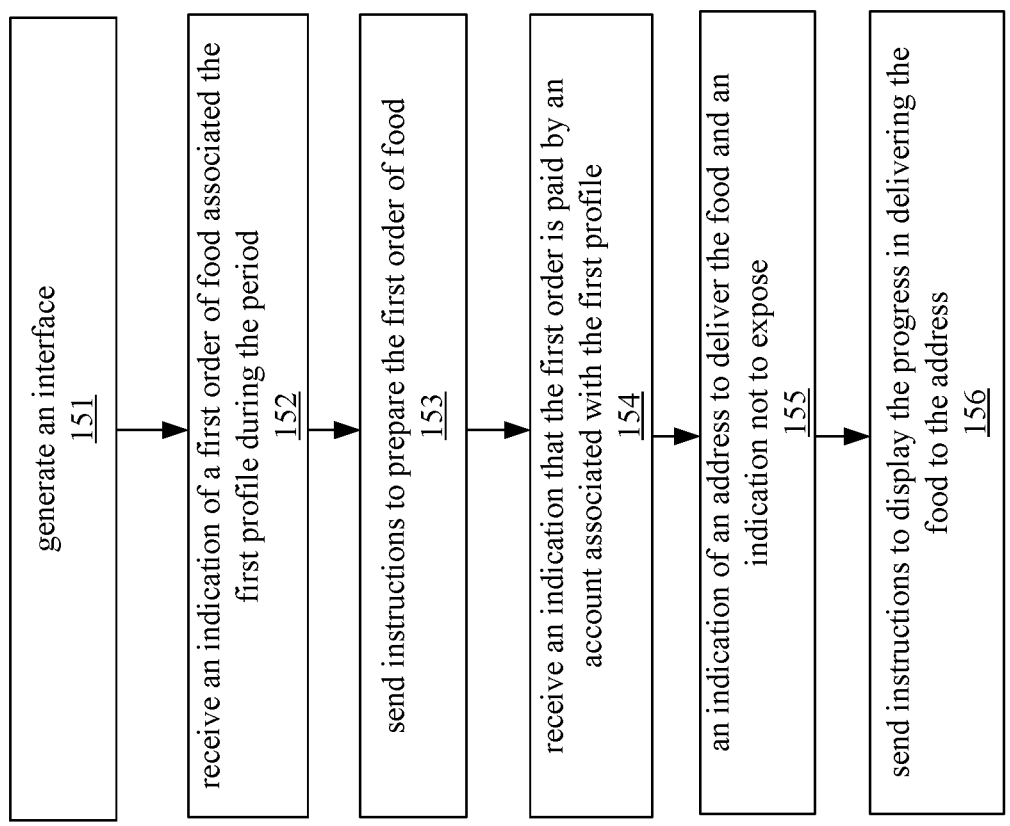
FIG. 6 illustrates an exemplary method for a real meal with virtual networking.

FIG. 6 illustrates an exemplary method for a real meal with virtual networking as disclosed herein. At step 151, generate an interface (e.g., graphical) for a second user for a second profile to order food associated with a first profile of a first user during a period. The period may be designated by the first user. It is contemplated that the second user can set the period. There may be an option to not allow users to order outside the time window. This may enable true lunch fellowship during the time window and otherwise may the virtual meeting more realistic. For example, realistic in the sense that if a person misses the lunch meeting at the physical office the person generally doesn't get a free lunch. There could be an option that provides for "leftovers" in which a budget is indicated that is extended outside of the threshold time for those who may try to order some food after the threshold time (e.g., after meeting has started or after meeting has ended).

With continued reference to FIG. 6, at step 152, receive an indication of a first order of food associated the first profile during the period. At step 153, send instructions to prepare the first order of food. At step 154, receive an indication that the first order is paid by an account associated with the first profile. At step 155, receive, e.g., by device 104, an indication of an address to deliver the food and an indication not to expose (e.g., keep private, such as do NOT display or send) the address to the first profile. At step 156, send instructions to display the progress in delivering the food to the address. This progress may be displayed to all parties of the meeting appointment, such as parties associated with device 101-device 103.

For a business lunch, a first date, or similar activity, it may be beneficial to allow for one individual to pay for another's meal that is delivered to the person's home. In addition, it may be beneficial, when considering privacy, to have the meal be delivered without the need to expose the address to the individuals participating in the activity.

The disclosed subject matter may be used for parties or family gatherings, as well. For example, a first user device may send a meeting appointment invite to my "friends." The friends RSVP and they may agree to eat from the same restaurant or same restaurant chain. The status of each user's food order, RSVP, online presence for the meeting, or the like may be displayed. The status may be deidentified, for example, there may be a status indicator that 70% of the users are in the meeting and have received their food. The status information may be based on the order deliverer device 106 sending an indication that the order is delivered. It is contemplated, as in this party scenario, that things other than food (e.g., party favors or other products for New Year's celebration) may be used. In a New Year's celebration scenario, each user may pay for their own food and the ability to congregate and watch others dance may be a significant reason to use the disclosed subject matter.

Although food products are mentioned herein, it is contemplated that the product may be something other than food. It is also contemplated that functions disclosed herein may be distributed over multiple devices. Different devices may send, receive, display, or process the messages or other information disclosed herein. For example, first user device 101 may send an invite message to second user device 102 or the invite message may be sent by order taker device 104 (e.g., with authorization from a first user associated with first user device 101) to second user device 102. It is contemplated that the first user and the second user are different people or entities. It is contemplated that the disclosed real meal with virtual networking may be used for restaurant delivery situations or grocery delivery situations. In the grocery delivery situations recipes may be sent with the delivered groceries.

Further considerations with regard to the real meal with virtual network are disclosed below. When eating is detected during the meeting, the conferencing system may provide instructions to use virtual reality, augmented reality, still picture, or blacked out block (e.g., camera turned off). The eating detection trigger of the conferencing system may be turned on based on the indication of food (e.g., link to order food) in an invite message. The augmented reality may be a superimposed virtual face over a video of a first user's face that generate lip movements based on words that are spoken during the conference.

In addition, food ordering in real life may be linked to a virtual environment. There may be an avatar with no virtual food at a virtual table. Virtual food may be displayed at the virtual table in response to an indication of real food being delivered. There may be some built in delay to display the virtual food in order for it to be unpacked and set on table or the like.

The meeting appointment using the conferencing system may be done with avatars in virtual reality and, as disclosed herein, linked to food or other ordering and delivery in the real world. For example, in a virtual world a first user may walk to a chicken restaurant with his friends while talking with them, stand in line to complete a virtual order, complete the virtual order with a virtual teller, and sit down or otherwise wait for the virtual order. This virtual order may be linked to a real-world ordering system and first user may receive a real food order via delivery at a home, office, hotel, or the like location of the first user.

Other social uses are for the meeting appointment and other systems are disclosed herein. For example, virtual running events may be implemented. For example, there may be a group of users (e.g., first user-third user, among many others) that want to participate in a national 5K race. Each user may have a device, such as device 101-device 103. They may run on similar terrain across the country and start at the same time. The terrain may be selected for each user near the user or the user may select and be given a grade of the terrain. Some terrain may be more challenging than others, even if it is the same distance. Winners or awards may be generated based on the terrain grade, time of completion, wind resistance, among other things. It is contemplated that device 101-device 103 may have the necessary sensors (e.g., GPS, accelerometer, gyroscopes, or cameras, etc.) that will accurately track the users movements. Information from Geographic information systems (GIS), satellite imaging (e.g., photos of the terrain analyzed for obstructions), or other systems may be used to grade how challenging the terrain is. Such virtual running system may be particularly useful when there is a desire to do an activity simultaneously as done conventionally with local 5K, 10K, or other road races. This may be used for Olympic, Collegiate, or athletic events that depend on individual performance done at approximately the same time (note that simultaneous use is not necessary).

The disclosed subject matter may be used for track and field sports, motorsports (e.g., car racing), golfing, skeet shooting, horseback riding, cycling, hiking, or surfing, among other activities. In a golfing scenario, courses in an area (e.g., county, city, or state) may be graded. The grade may be based on speed of the green, elevations (e.g., hills or valleys), bunker use (e.g., amount, dimensions, or position of bunkers), water hazard use (e.g., amount, dimensions, or position of water hazards), ruff use (e.g., amount, dimensions, or position of the ruff), tree use (e.g., amount, dimensions, or position of shrubs or trees), shape of the fairway, tee use (e.g., dimension or position of tee), hole position, or the like. Sensors may be put into the sporting equipment (e.g., golf club) in order to track the activity during a time frame. Further in the golf scenario, tee times may be scheduled as a group (e.g., group 1 with Bob at a first course location and John at a second course location). It is contemplated that tee times may be at the same course, but staggered with a maximum number in a group for appropriate social distancing. Note the grade of the course (or other terrain for a particular activity) may be used in determining a final score and winner for the activity (e.g., golf winner, race winner, hiking winner, etc.). It is further contemplated that the alerts, electronic calendar messaging, payments, and the other subject matter disclosed herein (e.g., associated with FIG. 1-FIG. 6 and related discussion) may apply to activities (e.g., 5K run or golf). In addition, it is contemplated there may be a combination of the meals (or products) subject matter is combined with activity subject matter. For example, meals may be delivered to the location of the activity; and the meals and the activity are paid for by one user using the disclosed system. Teleconferencing or video conferencing may be incorporated using devices attached or with the user (e.g., mobile phone, smart glasses, or the like), devices integrated into the activity equipment (e.g., microphone or video camera), or devices integrated into the course (e.g., security or other video cameras or microphones). Communications not related to the conferencing may be stopped during the time of the activity for the users, such as by a do not disturb system (which may be overridden based on an indicated emergency).

The disclosed subject matter be used for a telehealth scenario. For example, instead of food it may be health equipment, such as electronic thermometers, blood pressure machines, swabs, antigen tests, or the like. The end user may operate the equipment or a telehealth technician (e.g., nurse or nurse practitioner) may arrive with or near the time of the health equipment and perform the tests as needed.

The disclosed subject matter may be used with different products and, again, particularly useful in a business scenario. Business scenario may include activities, such as meals or golf. Other business scenarios may include delivery of information technology equipment (e.g., computers) to an employee and the setting up a call with the IT staff to walkthrough setup.

It is also envisioned that when a product (e.g., meal, golf clubs, party favors, cigars, etc.) arrives that a organizer (e.g., payer) of delivery of such product may receive an automatic indication that the delivery of the product has occurred to a planned attendee of the conference. The mobile device or other device may receive a conferencing message associated with starting relatively immediately (e.g., within 5 minutes) or in the future, or joining the conferencing communication. The conferencing message may be a first alert, such as "please start your conference." The conferencing message may be a second alert that includes the links (or other information) for starting the conference (e.g., video conference or teleconference) and then the user device that received the links would need to receive a login with a username or password. The conferencing message may be a third alert, which provides for an interface (e.g., electronic calendar appointment) to setup a conference call in the future. The conferencing message may be a fourth alert in which the user may just receive the communication and therefore be authorized to login by answering the phone and pressing #or clicking the link created for that particular invited user, rather than having to login with an extensive username or password. In an example, Bob's link and John's link are different and when logged in Bob may be seen (or recorded as audio) as "Bob" and John is seen as "John." The link (or call) could be a general authorization link to enter the conference in which the links are substantially the same. Again, the trigger for the conferencing message to be generated or sent may be based on an indication that that a product (again, also considering as meal herein) has been delivered. It is contemplated that instead of a preset definite hour and day for a conference meeting it can be based on the approximate delivery time and date of the order. For example, for the conference meeting (e.g., meeting appointment), instead of putting "time=12 pm conference for 1 hour on May 1, 2019;" there may be a setting such as "time='delivery time of product A' for 1 hour on 'delivery date of product A.'" This system may be used in the telehealth scenario when a nurse practitioner arrives a conference starts to be setup with sending of message and connections of devices.

It is also envisioned that when a product arrives that a funder or organizer (e.g., payer) of such product may receive an automatic indication that the delivery of the product has occurred to a planned attendee of the conference. Based on the indication of the delivery, the funder device (e.g., first user device 101) and receiver (e.g., second user device 102) may be automatically linked to enable an audio or video call. This may be a cordial call to say thank you to the first user, may be a call to hope the second user enjoys the product, or may be call for business related discussions. The callerID in the context of the call or message subject in other contexts may indicate that the communication is associated with the delivery (e.g., "call about delivery of product A"). Along the same lines, there may be cordial messages delivered automatically. For example, based on an indication of delivery of the product an account of the second user may send a pre-pared or near-real time prepared thank you message to the account of the first user, such as "thank you for the product A, I will let you know if I have any issues." In another example, based on an indication of delivery of the product an account of the first user may send a thank you message to the account of the second user, such as "I hope you enjoy the product A, please let me know if you have any issues."

Further the disclosed system may be used in scenarios such as watching newly released movies. The movie may be scheduled for different times, similar to real movie theaters and access may be granted at the that time for the movie on a device at a location (e.g., computer or TV at home address, neighborhood clubhouse, or park). Food, such as popcorn, chips, or drinks, may be delivered at approximately the same time as the movie start (e.g., within 30 minutes of the start time). This may be an even more decentralized way to release movies. Further it is contemplated that video conferencing may be integrated into such experience, in which videos of families or friends may be at the bottom or other edge of the viewable screen for the movie. Audio may be on or audio may be turned off and just video or text. A large television screen, projector screen, or projector, among other products, may be ordered (e.g., purchased or rented) for the movie appointment time.

The meeting appointment as disclosed herein may be related to ordering transportation for a destination. In an example, a vehicle (which may be autonomous SAE level 3-level 5) may be ordered to take a second user to the airport, but food may be ordered as well. The food may need to be picked up or may already be in the vehicle. The food may be freshly cooked or snack items such as grain bars, water, juices, potato chips, or the like.

The real meal with virtual networking system may be integrated into a social media site. In this setup, "friends" (or linked colleagues) may choose each other from a drop-down menu or the like for the appointment on the electronic calendar or the online service for ordering food.

In the future, the amount of home or remote working will increase substantially. The disclosed subject matter may help address many of the issue that may occur because of such a remote working environment. It is contemplated that as people move around they may be a place in which it is inappropriate to take a video or conference call (e.g., driving home). In this scenario, the location of a user of a mobile device may receive a notification to suggest another time (e.g., reschedule) or inform other meeting participants that they will be late. The user of the mobile device may select an option to inform other participants (all or some) of the meeting. Subsequent to the notification being sent the other users may be able to respond.

Figure 7:
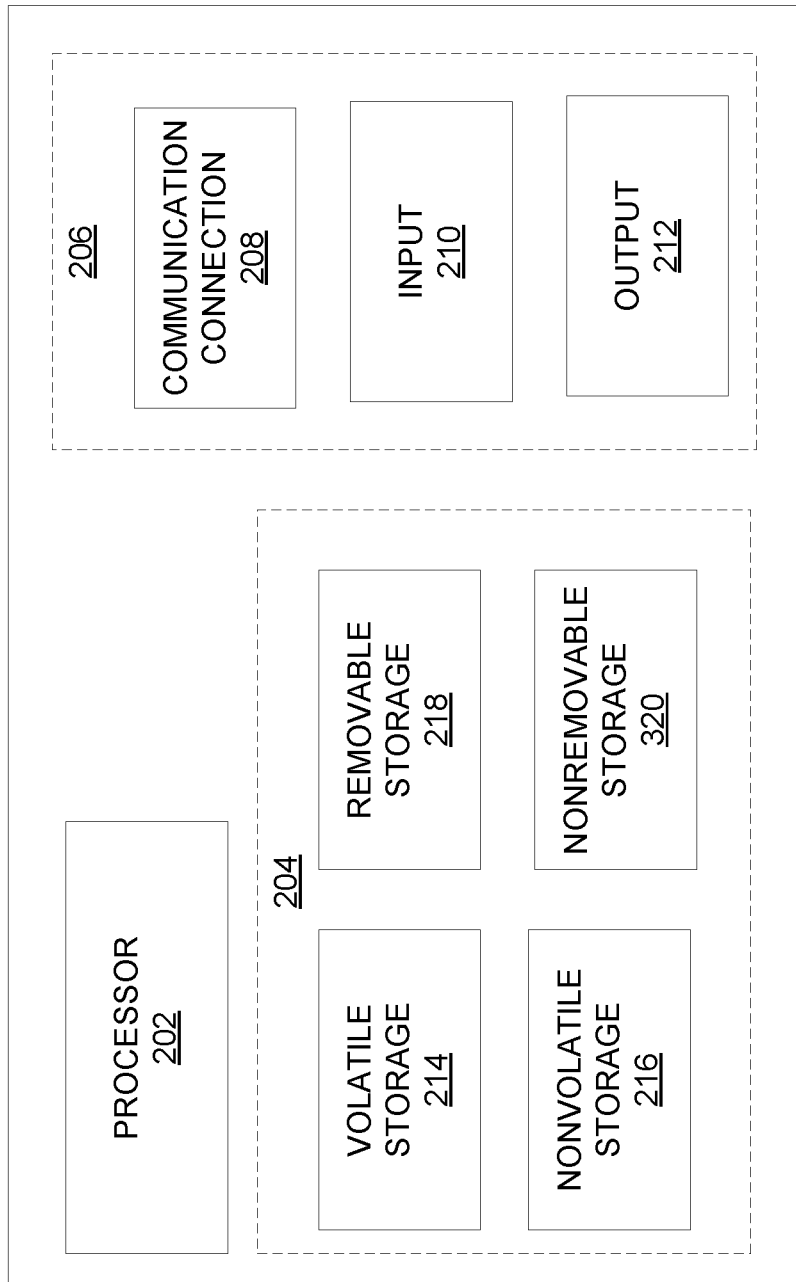
FIG. 7 illustrates a schematic of an exemplary network device.

FIG. 7 is a block diagram of network device 200 that may be connected to or comprise a component of a system, such as FIG. 1. Network device 200 may comprise hardware or a combination of hardware and software. The functionality to facilitate telecommunications via a telecommunications network may reside in one or combination of network devices 200. Network device 200 depicted in FIG. 7 may represent or perform functionality of an appropriate network device 200, or combination of network devices 200, such as, for example, a component or various components of a cellular broadcast system wireless network, a processor, a server, a gateway, a node, or the like, or any appropriate combination thereof. It is emphasized that the block diagram depicted in FIG. 7 is exemplary and not intended to imply a limitation to a specific implementation or configuration. Thus, network device 200 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 200 may comprise a processor 202 and a memory 204 coupled to processor 202. Memory 204 may contain executable instructions that, when executed by processor 202, cause processor 202 to effectuate operations associated with mapping wireless signal strength.

In addition to processor 202 and memory 204, network device 200 may include an input/output system 206. Processor 202, memory 204, and input/output system 206 may be coupled together (coupling not shown in FIG. 7) to allow communications between them. Each portion of network device 200 may comprise circuitry for performing functions associated with each respective portion. Thus, each portion may comprise hardware, or a combination of hardware and software. Input/output system 206 may be capable of receiving or providing information from or to a communications device or other network entities configured for telecommunications. For example, input/output system 206 may include a wireless communications (e.g., 3G/4G/GPS) card. Input/output system 206 may be capable of receiving or sending video information, audio information, control information, image information, data, or any combination thereof. Input/output system 206 may be capable of transferring information with network device 200. In various configurations, input/output system 206 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 206 may comprise a Wi-Fi finder, a two-way GPS chipset or equivalent, or the like, or a combination thereof.

Input/output system 206 of network device 200 also may contain a communication connection 208 that allows network device 200 to communicate with other devices, network entities, or the like. Communication connection 208 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 206 also may include an input device 210 such as keyboard, mouse, pen, voice input device, or touch input device. Input/output system 206 may also include an output device 212, such as a display, speakers, or a printer.

Processor 202 may be capable of performing functions associated with telecommunications, such as functions for processing broadcast messages, as described herein. For example, processor 202 may be capable of, in conjunction with any other portion of network device 200, determining a type of broadcast message and acting according to the broadcast message type or content, as described herein.

Memory 204 of network device 200 may comprise a storage medium having a concrete, tangible, physical structure. As is known, a signal does not have a concrete, tangible, physical structure. Memory 204, as well as any computer-readable storage medium described herein, is not to be construed as a signal. Memory 204, as well as any computer-readable storage medium described herein, is not to be construed as a transient signal. Memory 204, as well as any computer-readable storage medium described herein, is not to be construed as a propagating signal. Memory 204, as well as any computer-readable storage medium described herein, is to be construed as an article of manufacture.

Memory 204 may store any information utilized in conjunction with telecommunications. Depending upon the exact configuration or type of processor, memory 204 may include a volatile storage 214 (such as some types of RAM), a nonvolatile storage 216 (such as ROM, flash memory), or a combination thereof. Memory 204 may include additional storage (e.g., a removable storage 218 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 200. Memory 204 may comprise executable instructions that, when executed by processor 202, cause processor 202 to effectuate operations to map signal strengths in an area of interest.

Figure 8:
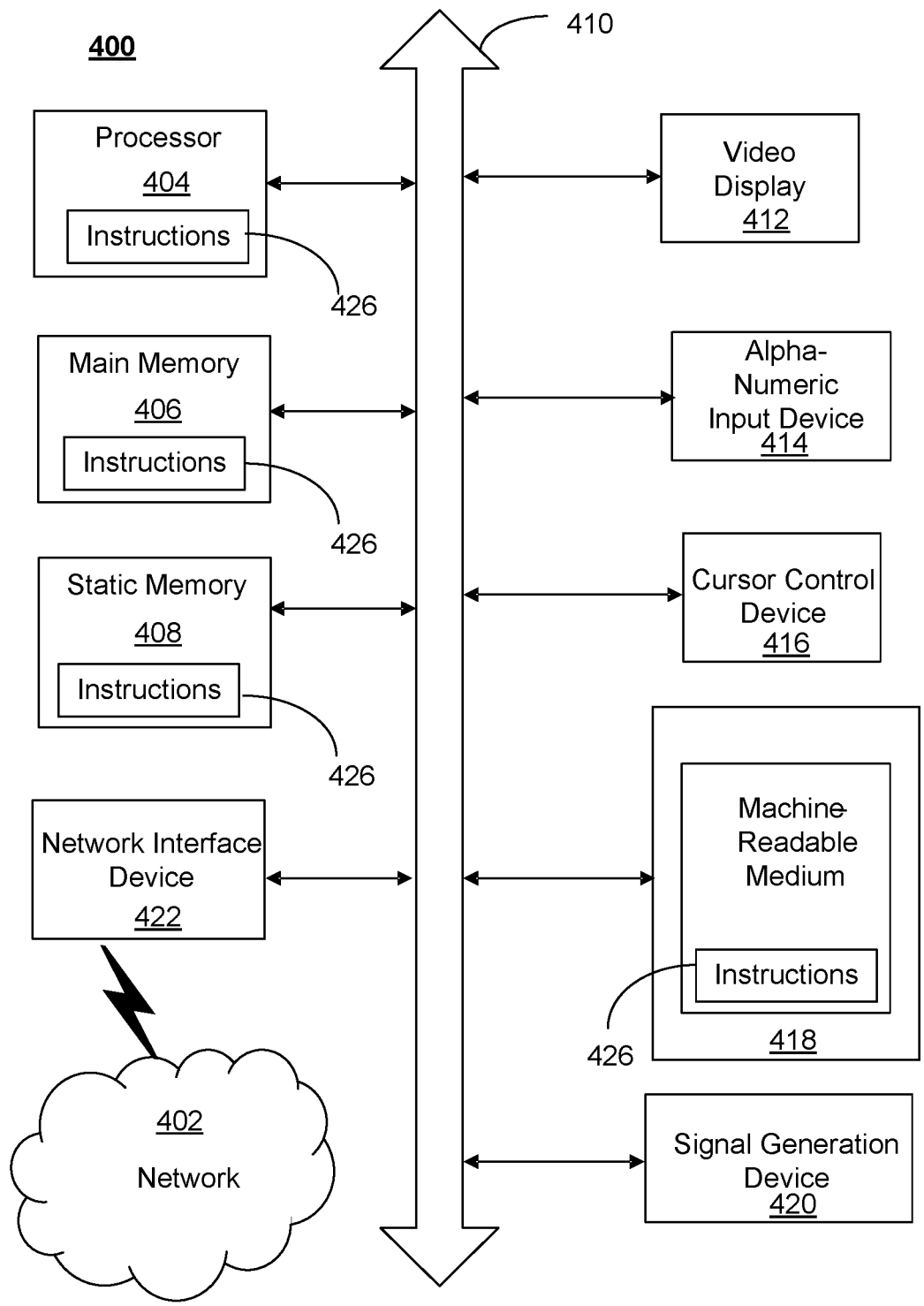
FIG. 8 illustrates an exemplary computer system.

FIG. 8 depicts an exemplary diagrammatic representation of a machine in the form of a computer system 400 within which a set of instructions, when executed, may cause the machine to perform any one or more of the methods for real meal with virtual networking described herein. One or more instances of the machine can operate, for example, as processor 202 or device 101-device 107 and other devices of FIG. 1. In some examples, the machine may be connected (e.g., using a network 402) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 400 may include a processor (or controller) 404 (e.g., a central processing unit (CPU)), a graphics processing unit (GPU, or both), a main memory 406 and a static memory 408, which communicate with each other via a bus 410. The computer system 400 may further include a display unit 412 (e.g., a liquid crystal display (LCD), a flat panel, or a solid state display). Computer system 400 may include an input device 414 (e.g., a keyboard), a cursor control device 416 (e.g., a mouse), a disk drive unit 418, a signal generation device 420 (e.g., a speaker or remote control) and a network interface device 422. In distributed environments, the examples described in the subject disclosure can be adapted to utilize multiple display units 412 controlled by two or more computer systems 400. In this configuration, presentations described by the subject disclosure may in part be shown in a first of display units 412, while the remaining portion is presented in a second of display units 412.

The disk drive unit 418 may include a tangible computer-readable storage medium on which is stored one or more sets of instructions (e.g., software 426) embodying any one or more of the methods or functions described herein, including those methods illustrated above. Instructions 426 may also reside, completely or at least partially, within main memory 406, static memory 408, or within processor 404 during execution thereof by the computer system 400. Main memory 406 and processor 404 also may constitute tangible computer-readable storage media.

While examples of a system in which messaging for real meal with virtual networking can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—real meal with virtual networking—as illustrated in the Figures, specific terminology is employed for the sake of clarity. The claimed subject matter, however, is not intended to be limited to the specific terminology so selected. Note also that the term "real meal with virtual networking" is contemplated to be referred to as a real component (e.g., product or activity) with a virtual (e.g., computer based) component. For example, the disclosed system may be used for a 5K run, track and field sports, motorsports (e.g., car racing), golfing, skeet shooting, horseback riding, cycling, hiking, or surfing, among other things.

This written description uses examples to enable any person skilled in the art to practice the claimed subject matter, including making and using any devices or systems and performing any incorporated methods. Other variations of the examples are contemplated herein. In addition, the use of the word "or" is generally used inclusively unless otherwise provided herein.

Methods, systems, and apparatuses, among other things, as described herein may provide for generating an interface (e.g., graphical) for a second user for a second profile to order food associated with a first profile of a first user during a period, wherein the period is designated by the first user (contemplate second user can set period); receiving an indication of a first order of food associated the first profile during the period; sending instructions to prepare the first order of food; receiving an indication that the first order is paid by an account associated with the first profile; receiving an indication of an address to deliver the food and an indication not to expose (e.g., keep private, such as do NOT display or send) the address to the first profile; and send instructions to display the progress in delivering the food to the address. Methods, systems, and apparatuses, among other things, as described herein may provide for receiving an invite message, wherein the invite message is associated with a first profile of a first user; receiving a selection of a link to an online service for food, wherein the link is in the invite message, wherein the selection is associated with a second profile of a second user; based on the selection, subsequently: displaying food to order via the online service; and displaying an indication that the food to order via the online service is paid by an account associated with the first profile. The method, system, computer readable storage medium, or apparatus may provide for receiving an indication of an order of first food of the food to order via the online service; sending an indication of an address (e.g., a street address) to deliver the order of the first food; and sending an indication to not expose the address to the first user. All combinations in this paragraph (including the removal or addition of steps) and the below paragraphs are contemplated in a manner that is consistent with the other portions of the detailed description.

The method, system, computer readable storage medium, or apparatus may provide for Filling out an electronic form by a first user. The filled electronic form comprises an email address (text or the like electronic address) of the second user; OR wherein the filled electronic form comprises a name or another electronic identifier of the second user. The first user is NOT made aware, via the website, of the particular location of the second user or the location in which the order will be sent. The order taker or the order preparer is aware of the particular location of the second user. The particular location of the second user may be based on an address or GPS of a mobile device of the second user. The first user is made aware, vis the website, of the general location of the second user or the location in which the order will be sent. The general location is based on the particular location but shown via the website as just shown as a generic (or less specific) location label. The generic location label comprises home, work, remote, city, state, or other label that is created by user but not the particular location. The second user must give permission before the first user can be presented with the particular location of the second user. All combinations in this paragraph (including the removal or addition of steps) and the below paragraph is contemplated in a manner that is consistent with the other portions of the detailed description.

The method, system, computer readable storage medium, or apparatus may provide for sending invite message from a first profile associated with a first user to a second user. The first user and the second user are different. The message comprises a link to a website or another application (e.g., mobile app). The website is for participating in an activity. The activity may be one type (e.g., genre) or multiple types. The multiple types of activities may include sports or the like (e.g., 5K, golf, motorsports, track and field, etc.). The website may be for a particular site or for multiple sites. The message (or website) may include an indication that the activity will be paid by someone else (e.g., second user). The message may include an indication of a budget for purchase of the activity (e.g., number of golf balls, number of rounds of golf). The budget may include a threshold monetary amount for the purchase, a threshold number of items for use in the activity, a threshold number of times to do the activity, a threshold amount of time to purchase the activity or items for the activity, or a threshold amount of time to use the link. The threshold amount of time to purchase the activity (or related items) or use the link may be based on a meeting appointment associated with an electronic calendar; wherein the time budget may be based on an amount of time to prepare (activity organizer or end user), complete the activity, or the like. The link to the website for ordering the activity may be within a meeting appointment message to the second user. The activity area (e.g., track, road, or other course) may be reserved. The website may be displayed to be generic or displayed to have an indication of a corporation in which the first user may be employed by or owns. All combinations in this paragraph (including the removal or addition of steps) and the below paragraph is contemplated in a manner that is consistent with the other portions of the detailed description.

The method, system, computer readable storage medium, or apparatus may provide for sending invite message from a first profile associated with a first user to a second user. The first user and the second user are different. The message may include a link to a website. The website may be for ordering food. The food may be one type (e.g., genre) or multiple types. The website may be for a particular restaurant or for multiple restaurants. The message (or website) may include an indication that the food will be paid by someone else (e.g., second user). The message may include an indication of a budget for purchase of the food. The budget may include a threshold monetary amount for the purchase, a threshold number of food items, a threshold amount of time to purchase the food, or a threshold amount of time to use the link. The threshold amount of time to purchase the food or use the link may be based on a meeting appointment associated with an electronic calendar; wherein the time budget may be based on an amount of time to prepare (restaurant or end user), deliver the food, or unpack for eating, or the like. The link to the website for ordering food may be within a meeting appointment message to the second user. The meeting appointment may be for a video conference, or a teleconference, virtual conference (e.g., virtual or augmented reality of one or more persons). The meeting appointment may be for a physical location (e.g., a street address) in which the first user or second user can meet. The physical location may be for dining in which to allow the first user or second user to enjoy food from different restaurants. The dining table (or area) may be reserved. The website may be displayed to be generic or displayed to have an indication of a corporation in which the first user is employed by or owns. All combinations in this paragraph (including the removal or addition of steps) are contemplated in a manner that is consistent with the other portions of the detailed description.

What is claimed:

1. A system for electronic invitations and virtual conferencing, the system comprising:

one or more processors; and memory coupled with the one or more processors, the memory storing executable instructions that when executed by the one or more processors cause the one or more processors to effectuate operations comprising:

receiving an electronic invite message from a computing device, wherein the electronic invite message is associated with a first electronic profile of a first user;

receiving a selection of a link to an online service for food, wherein the link is in the electronic invite message, wherein the selection is associated with a second electronic profile of a second user;

based on the selection, subsequently displaying:
food to order via the online service; and
an electronic indication that the food to order via the online service is paid by an account associated with the first electronic profile;

receiving an electronic indication of an order of first food of the food to order via the online service;

sending an electronic indication of a location to deliver the order of the first food; and sending an electronic indication to not expose the location to the first user.

2. The system of claim 1, wherein the electronic invite message comprises a meeting request associated with an electronic calendar.

3. The system of claim 1, wherein the electronic invite message comprises a meeting request associated with an electronic calendar; wherein the meeting request is for an electronic conference.

4. The system of claim 1, wherein the electronic invite message comprises a meeting request associated with an electronic calendar; wherein the meeting request is for an electronic conference comprises an audio conference.

5. The system of claim 1, wherein the electronic invite message comprises a meeting request associated with an electronic calendar; wherein the meeting request is for an electronic conference comprises a video conference.

6. The system of claim 1, wherein the electronic invite message comprises a meeting request associated with an electronic calendar; wherein the meeting request is for an electronic conference comprises a virtual or augmented reality conference.

7. The system of claim 1, wherein the displaying further comprises an electronic indication of a budget for the food to order.

8. The system of claim 1, wherein the location is a street address.

9. The system of claim 1, the operations further comprising automatically generating the virtual conference after period, in response to receiving an electronic indication of the delivered order.

10. A computer readable storage medium storing computer executable instructions that when executed by a computing device cause said computing device to effectuate operations comprising:

receiving an electronic invite message, wherein the electronic invite message is associated with a first electronic profile of a first user;

receiving a selection of a link to an online service for food, wherein the link is in the electronic invite message, wherein the selection is associated with a second electronic profile of a second user;

based on the selection, subsequently displaying:
food to order via the online service; and
an electronic indication that the food to order via the online service is paid by an account associated with the first electronic profile;

receiving an electronic indication of an order of first food of the food to order via the online service;

sending an electronic indication of a location to deliver the order of the first food; and sending an electronic indication to not expose the location to the first user.

11. The computer readable storage medium of claim 10, wherein the electronic invite message comprises a meeting request associated with an electronic calendar.

12. The computer readable storage medium of claim 10, wherein the location is a global positioning system based coordinate.

13. The computer readable storage medium of claim 10, wherein the location is a street address.

14. The computer readable storage medium of claim 10, wherein the electronic invite message comprises a meeting request associated with an electronic calendar; wherein the meeting request is for an electronic conference.

15. The computer readable storage medium of claim 10, wherein the electronic invite message comprises a meeting request associated with an electronic calendar; wherein the meeting request is for an electronic conference comprises an audio conference.

16. The computer readable storage medium of claim 10, wherein the electronic invite message comprises a meeting request associated with an electronic calendar; wherein the meeting request is for an electronic conference comprises a video conference.

17. The computer readable storage medium of claim 10, wherein the electronic invite message comprises a meeting request associated with an electronic calendar; wherein the meeting request is for an electronic conference comprises a virtual or augmented reality conference.

18. The computer readable storage medium of claim 10, wherein the displaying further comprises an electronic indication of a budget for the food to order.

19. A system comprising:
one or more processors; and
memory coupled with the one or more processors, the memory storing executable instructions that when executed by the one or more processors cause the one or more processors to effectuate operations comprising:

generating an interface for a second user for a second electronic profile to order food associated with a first electronic profile of a first user during a period, wherein the period is designated by the first user;

receiving an electronic indication of a first order of food associated the first electronic profile during the period;

sending electronic instructions to prepare the first order of food;

receiving an electronic indication that the first order is paid by an account associated with the first electronic profile;

receiving an electronic indication of a location to deliver the food and an electronic indication not to expose the location to the first electronic profile; and send electronic instructions to display the progress in delivering the food to the location.

20. The system of claim 19, wherein the location is a street address.

* * * * *